United States Patent [19]
Gellert

[11] Patent Number: 5,122,050
[45] Date of Patent: Jun. 16, 1992

[54] INJECTION MOLDING PROBE WITH A LONGITUDINAL THERMOCOUPLE BORE AND OFF CENTER HEATING ELEMENT

[76] Inventor: Jobst U. Gellert, 7A Prince Street, Georgetown, Ontario, Canada, L7G 2X1

[21] Appl. No.: 675,874

[22] Filed: Mar. 27, 1991

[30] Foreign Application Priority Data

Feb. 27, 1991 [CA] Canada ................ 2037186

[51] Int. Cl.$^5$ ............................. B29C 45/20
[52] U.S. Cl. .................. 425/549; 219/421; 264/328.15; 425/568; 425/570
[58] Field of Search ............ 425/549, 568, 570; 264/328.15; 219/421, 423, 426

[56] References Cited

U.S. PATENT DOCUMENTS

| | | | |
|---|---|---|---|
| 4,161,386 | 7/1979 | Osuna-Diaz | 425/549 |
| 4,611,394 | 9/1986 | Gellert | 29/611 |
| 4,712,995 | 12/1987 | Basnett | 425/562 |
| 4,768,283 | 9/1988 | Gellert | 425/569 |
| 4,810,184 | 3/1989 | Gellert et al. | 425/549 |
| 4,837,925 | 6/1989 | Gellert | 29/619 |

Primary Examiner—Tim Heitbrink
Attorney, Agent, or Firm—Dalesman & Company

[57] ABSTRACT

An elongated probe which extends into the melt passage in an injection molding system. The probe has an integral electrical heating element which extends longitudinally from a terminal near the rear end. The probe also has a longitudinal bore which extends beside the heating element to receive a thermocouple wire to monitor the temperature near the forward end of the probe. The heating element extends off center in the body of the probe which provides the body of the probe with the combination of a minimum outer diameter and sufficient thickness between and around the heating element and the thermocouple bore. A forward portion of the probe has a number of outwardly projecting locating fins. The thermocouple wire bends to extend radially outwardly through a groove at the rear end and is retained in place by a retaining screw received in a threaded bore. A ground wire extends in through a hole in a rim portion around the threaded bore and is also clamped in position by the retaining screw.

5 Claims, 4 Drawing Sheets

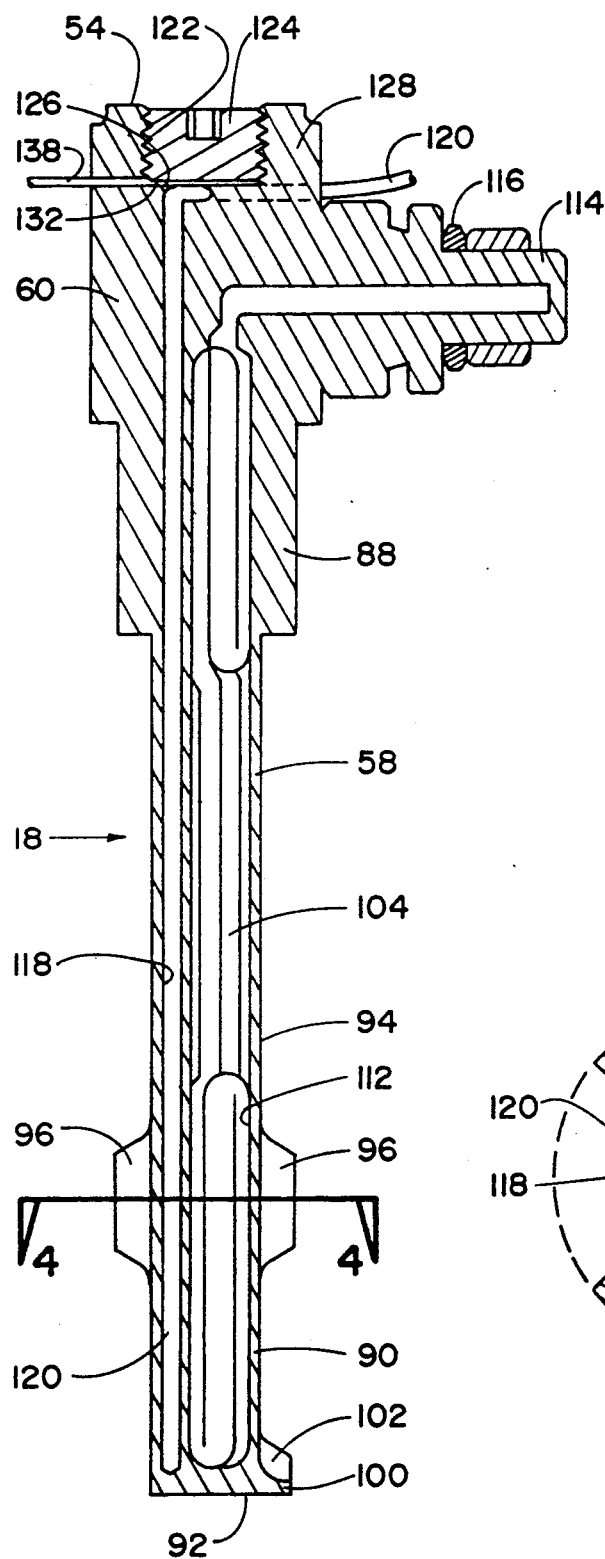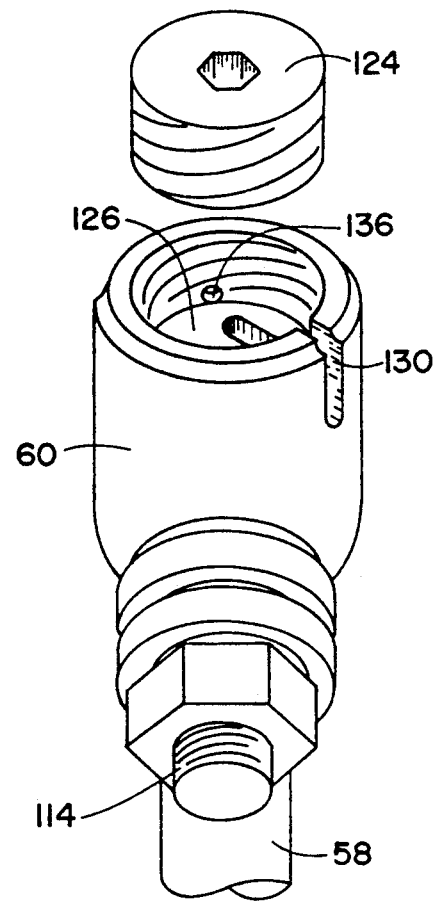
FIG. 3
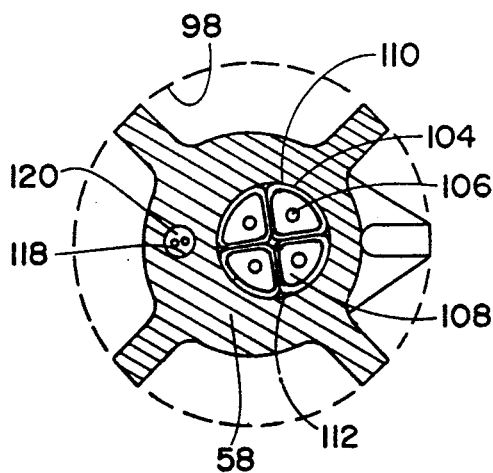
FIG. 4
FIG. 2

INJECTION MOLDING PROBE WITH A LONGITUDINAL THERMOCOUPLE BORE AND OFF CENTER HEATING ELEMENT

BACKGROUND OF THE INVENTION

This invention relates generally to injection molding and more particularly to an elongated heated probe having a longitudinal thermocouple bore and an off center integral electrical heating element.

Heated probes which are mounted to extend into an injection molding melt passage to heat the melt flowing around it are well known in the art. As seen in the applicant's Canadian patent application Serial Number 2,032,728 filed Dec. 19, 1990 entitled "Injection Molding Probe with Varying Heat Profile" it is known to provide the electrical heating element of such a probe with different numbers of multiple runs to have a varying heat profile along its length to compensate for different amounts of heat loss. The applicant's U.S. Pat. No. 4,611,394 shows an earlier type of heated probe with a thermocouple bore running down one side.

Heated nozzles in which the melt passage extends through the nozzle are also well known in the art. The distinction between a nozzle and a probe is that the melt passage extends through a nozzle, whereas it flows around a probe. A nozzle for valve gating is shown in U.S. Pat. No. 4,712,995 to Basnett which issued Dec. 15, 1987. In this case, the heating element and melt passage are off center to provide for the center gating valve pin.

Recent increasing demand for multi-cavity injection molding systems having greater numbers of cavities has made smaller component size of even more critical importance. At the same time, the increasing use of temperature critical materials has also made accurate temperature monitoring very critical. Therefore, it is very advantageous to position a thermocouple in a forward portion of the body of the probe itself without unnecessarily increasing the outer diameter of the body of the probe. Accurate location of the probe in the well and reliable retention of the thermocouple wire in the thermocouple bore have also been problems. Efficiently providing additional heat to the area of an off center gate is also very desirable in some instances.

SUMMARY OF THE INVENTION

Accordingly, it is an object of the present invention to at least partially overcome the disadvantages of the prior art by providing an elongated injection molding heated probe having a longitudinal thermocouple bore combined with the integral longitudinal electrical heating element being off center in the body of the probe.

To this end, in one of its aspects, the invention provides an injection molding heated probe having an elongated steel body with a rear end and a forward end, an integral electrically insulated heating element which extends longitudinally in the body from an external electrical terminal adjacent the rear end of the body, and a thermocouple bore which extends longitudinally in the body adjacent the heating element, having the improvement wherein the heating element extends off center in the body of the probe, thereby providing the body of the probe with the combination of a minimum outer diameter and sufficient thickness between and around the heating element and the adjacent thermocouple bore.

BRIEF DESCRIPTION OF THE DRAWINGS

FIG. 2 is a larger sectional view of the probe seen in FIG. 1, FIG. 3 is an isometric view of the rear end of the probe with the screw in position to be screwed in, FIG. 4 is a cross section view along line 4—4 in FIG. 2.

DETAILED DESCRIPTION OF THE DRAWINGS

Figure 1:
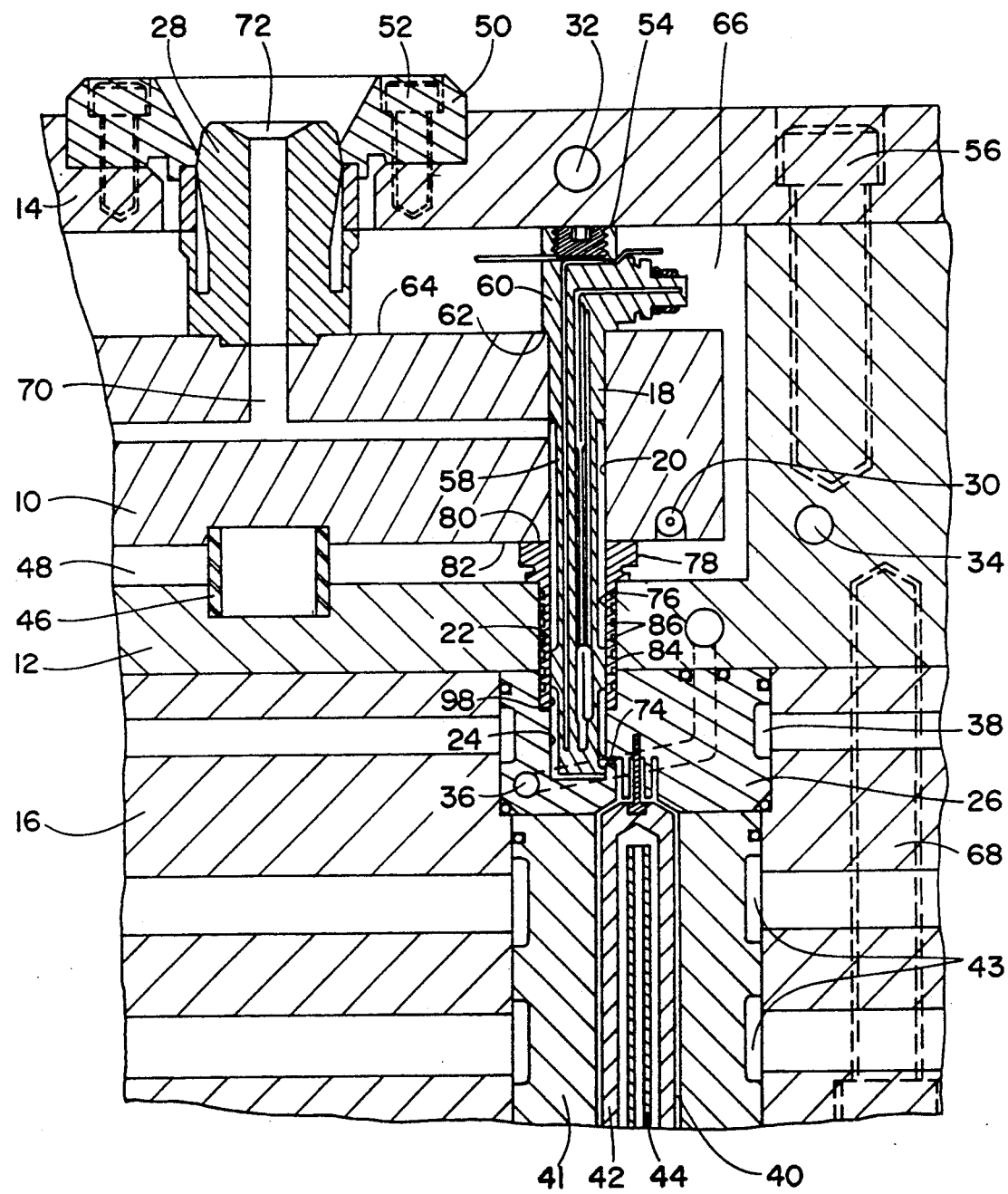
FIG. 1 is a sectional view of a portion of a multi-cavity injection molding system showing a probe according to a first embodiment of the invention.

Reference is first made to FIG. 1 which shows an injection molding system having a heated melt distribution manifold 10 and a cooled manifold retainer plate 12 extending between a back plate 14 and a cavity insert retainer plate 16. An elongated probe 18 according to a first embodiment of the invention extends through a bore 20 in the manifold 10 and another bore 22 in the manifold retainer plate 12 into a well 24 in a gate insert 26. While only a single probe 18 is shown for ease of illustration, the system will have a considerable number of adjacent probes and cavities identical to that shown.

The steel manifold 10 has a central manifold extension 28 and is heated by an electrical heating element 30 which is integrally cast into it. The steel back plate 14 is cooled by pumping cooling water through cooling conduits 32. The manifold retainer plate 12 is similarly cooled by pumping cooling water through cooling conduits 34. Other cooling conduits 36 branch into each gate insert 26 around the well 24. Each gate insert 26 also has a cooling channel 38 which extends around it. Each cavity 40 is formed of a predetermined size and shape between a cavity insert 41 and a core insert 42. The cavity insert 40 has cooling channels 43 which extend around the cavity 40. The core insert 42 is similarly cooled by pumping cooling water through a central cooling tube 44 in a conventional manner.

The distribution manifold 10 is located by a central locating ring 46 which is seated between the heated manifold 10 and the cooled manifold retainer plate 12 and provides an insulative air space 48 between them. The manifold extension 28 is also located by a locating ring 50 which is secured to the back plate 14 by bolts 52. The back plate 14 is, in turn, held securely against the rear ends 54 of the probes 18 by bolts 56 which extend into the manifold retainer plate 12. As described in more detail below, each probe 18 has an elongated steel body 58 with an enlarged rear portion 60 adjacent the rear end 54 having a shoulder 62 which abuts against the rear surface 64 of the manifold 10. In addition to holding the probes 18 securely in place, this provides another insulative air space 66 around the rear portions 60 of the bodies 58 of the probes 18 between the heated manifold 10 and cooled manifold retainer plate 12. The cavity insert retainer plate 16 is similarly secured to the manifold retainer plate 12 by bolts 68.

A melt passage 70 extends from a common inlet 72 in the manifold extension 28 and branches in the distribution manifold 10 to run around each heated probe 18 as it extends through the manifold 10 and manifold retainer plate 12 to a gate 74 leading to the cavity 40. Of course, the configuration of the melt passage 70 must have more branches than that illustrated to lead to a large number of probes 18 and cavities 40. Each probe 18 extends through a bore 76 in a sealing sleeve 78 which is seated in the bore 22 in the manifold retainer plate 12 and extends into the well 24 in the gate insert 26. The diameter of the bore 76 of the sealing sleeve 78 is the same as the diameter of the bore 20 through the manifold 10. The rear end 80 of the sealing sleeve 78 abuts against the forward surface 82 of the manifold 10 to prevent leakage of pressurized melt from the melt passage 70 into the air space 48. The sealing sleeve 78 has a ridged outer surface 84 which provides insulative air grooves 86 between it and the surrounding cooled manifold retainer plate 12 and gate insert 26.

Referring also to FIGS. 2, 3 and 4, each probe 18 has an elongated steel body 58 with an intermediate portion 88 between the rear portion 60 extending from the rear end 54 and a forward portion 90 extending to the forward end 92 of the probe 18. The intermediate portion 88 is just long enough to extend to the melt passage 70, and its diameter is just large enough to snugly fit in the bore 20 of the manifold 10 to prevent leakage of the pressurized melt between them.

The forward portion 90 of the body 58 of the probe 18 has a generally cylindrical outer surface 94 which is sufficiently smaller in diameter than the bore 20 through the manifold 10 for the melt passage 70 to extend between them around the probe 18. Four equally spaced fins 96 project outwardly from the outer surface 94 of the forward portion 90 to contact the cylindrical inner surface 98 of the sealing sleeve 78 to accurately locate the body 58 of the probe 18 at the operating temperature. The fins 96 are smoothly shaped to avoid any dead spots in the flow of melt between them. The forward portion 90 of the body 58 of the probe 18 also has a portion 100 at the forward end 92 which projects off center in alignment with the gate 74 leading to the cavity 40. In this embodiment, the projecting portion 100 extends laterally towards the gate 74 which is an edge gate. The projecting portion 100 has a smoothly curved groove 102 which is aligned to direct a stream of melt into the gate 74.

The probe 18 has a longitudinally extending electrical heating element 104 which is integrally brazed in nickel alloy into the steel body 58 as described in the applicant's Canadian patent application Serial Number 2,032,728 mentioned above. The heating element 104 has a central nickel-chrome resistance wire 106 extending through a refractory powder 108 such as magnesium oxide in a steel casing 110. In this embodiment, it is bent back upon itself in a desired configuration to provide a number of longitudinal sections having different numbers of runs of the heating element 104 to provide the probe 18 with a varying heat profile along its length. The multiple runs of the heating element 104 are swaged in a die to give them the circular cross section seen in FIG. 4 which just fits in a circular bore 112 in the body 58 of the probe 18. The resistance wire 106 has a bare end (not shown) and brazing the heating element 104 in the nickel alloy grounds the heating element, as well as provides a metallurgical bonding of the nickel alloy to the steel of the heating element 104 and the surrounding body 58. This integrally joins all the components together and improves the efficiency of the heat transfer from the heating element 104 to the surrounding body 58. The heating element 104 extends radially outward to an external electrical terminal 114 on the rear portion 60 of the body 58 of the probe 18. The terminal 114 is made of a number of components which are also integrally brazed together as described in the applicant's U.S. Pat. No. 4,837,925 which issued Jun. 13, 1989 to provide a threaded connection for an electrical lead 116.

The body 58 of the probe 18 also has a bore 118 for a removable thermocouple wire 120. This bore 118 extends longitudinally beside the heating element bore 112 to adjacent the forward end 92 of the probe 18. As best seen in FIG. 4, the heating element 104 extends off center beside the thermocouple bore 118 in the body 58 of the probe 18. This provides the body 58 of the probe 18 with the combination that it has a minimum outer diameter as well as sufficient thickness between and around the heating element 104 and the thermocouple bore 118.

The rear portion 60 of the body 58 of the probe 18 has a bore 122 extending from the rear end 54 which is threaded to receive a retaining screw 124. The threaded bore 122 has a bottom surface 126 from which the thermocouple bore 118 extends and is surrounded by a rim portion 128. A groove 130 extends in the bottom surface 126 radially outward from the thermocouple bore 118 through the rim portion 128. The thermocouple wire 120 is inserted into the thermocouple bore 118 and bent outwardly through the groove 130. The retaining screw 124 is then screwed into the threaded bore 112 and the forward surface 132 of the screw 124 retains the thermocouple wire 120 in place without clamping it. The thermocouple wire 120 is easily removable for replacement by removing the retaining screw 124. The rim portion 128 also has a hole 136 drilled radially through it at the level of the bottom surface 126. A wire 138 to ground the probe 18 extends in through the hole 136 and is clamped between the forward surface 132 of the retaining screw 124 and the bottom surface 126 of the threaded bore 122.

In use, the injection molding system or apparatus is assembled as shown in FIG. 1. Electrical power is applied to the heating element 30 in the manifold 10 and the heating element 104 in each probe 18 to heat them to a predetermined operating temperature. Pressurized melt from a molding machine (not shown) is then injected into the melt passage 70 through the common inlet 72 in the manifold extension 28 according to a predetermined cycle in a conventional manner. The pressurized melt flows along around each heated probe 18 and through the gates 74 to fill the cavities 40. After the cavities 40 are filled, injection pressure is held momentarily to pack and then released. After a short cooling period, the mold is opened to eject the molded products. After ejection, the mold is closed and injection pressure is reapplied to refill the cavities. This cycle is continuously repeated with a frequency dependent on the size and shape of the cavities and the type of material being molded. The temperature in the areas of the gates is cycled to provide effective thermal gating. The power to the heating elements 104 is switched off just after packing. The heat in the gate and cavity areas is quickly dissipated by the cooling water and the gates 74 freeze off to provide a clean break. Power is reapplied to the heating elements 104 just before the mold is closed. This rapidly heats the solidified melt in the gates 104 so they open immediately when melt injection pressure is reapplied after the mold is closed.

Figure 5:
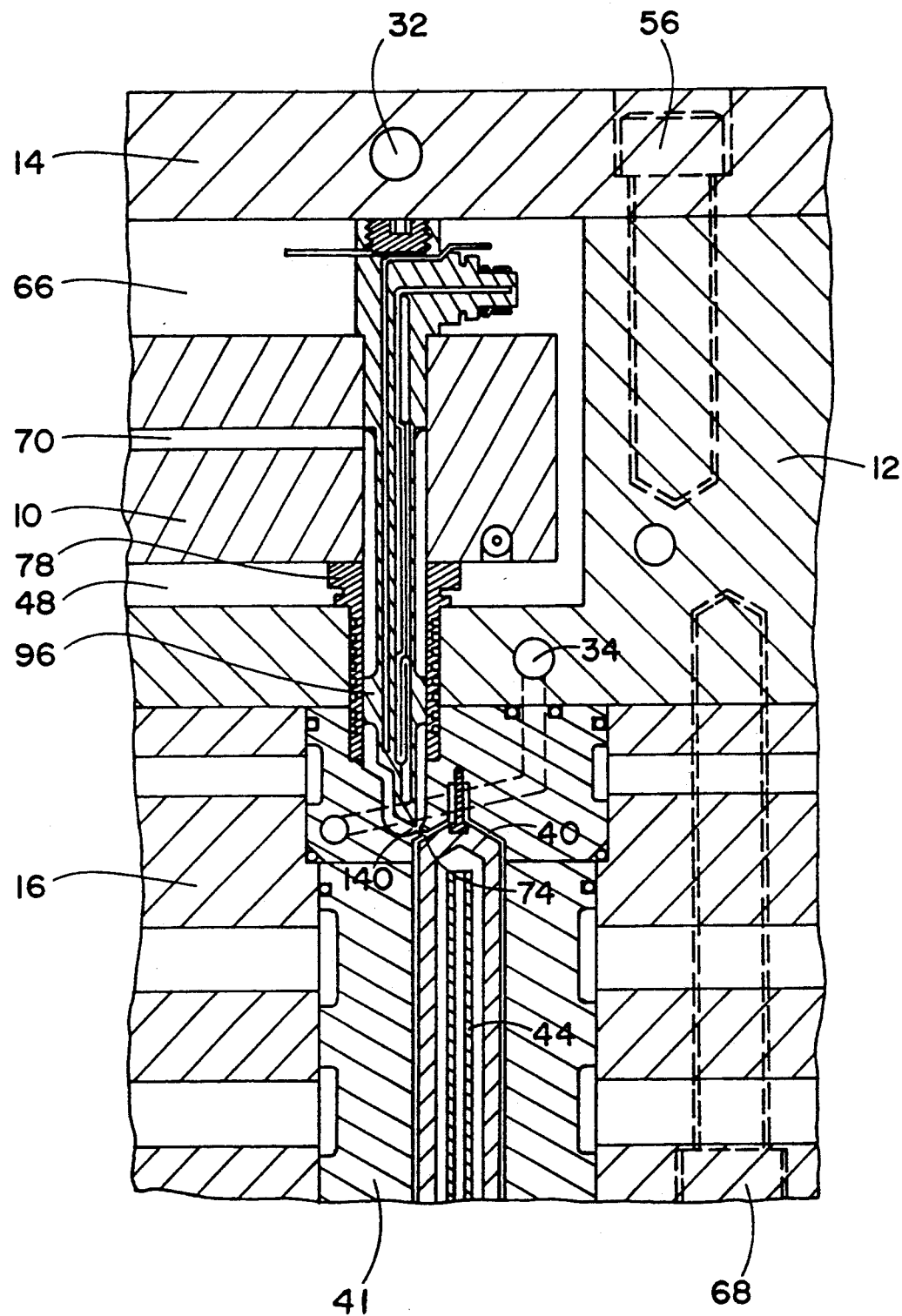
FIG. 5 is a sectional view of a portion of another multi-cavity injection molding system showing a probe according to a second embodiment of the invention.
Figure 6:
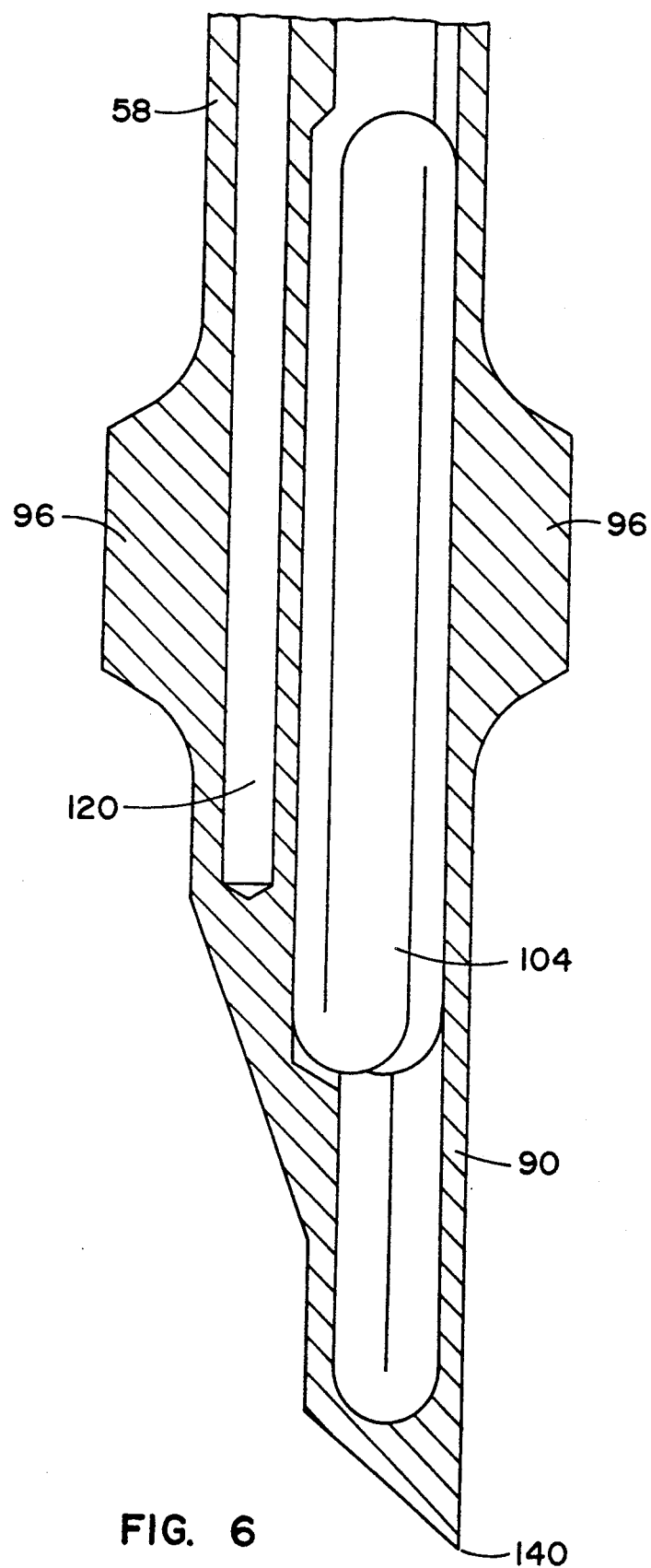
FIG. 6 is a larger sectional view of a forward portion of the probe seen in FIG. 5.

Reference is now made to FIGS. 5 and 6 to describe a second embodiment of the invention. As most of the elements of this embodiment are the same as those of the first embodiment, elements common to both embodiments are described and illustrated using the same reference numerals. As seen in FIG. 5, in this embodiment, the cavities 40 have a somewhat different shape and therefore the gates 74 are in a different location. Therefore, as best seen in FIG. 6, the forward portion 90 of the body 58 of each probe 18 has a slightly different configuration. In this embodiment, the projecting portion is a pointed tip 140 which projects at one side of the forward portion 90 in alignment with the gate 74 at an angle.

While the description of the probe 18 has been given with respect to preferred embodiments, it is not to be construed in a limiting sense. Variations and modifications will occur to those skilled in the art. Also, the probes 18 can be used in a variety of different mold configurations from that shown. Reference is made to the appended claims for a definition of the invention.

The embodiments of the invention in which an exclusive property or privilege is claimed are defined as follows:

1. In an injection molding heated probe having an elongated steel body with a rear end and a forward end, an integral electrically insulated heating element which extends longitudinally in the body from an external electrical terminal adjacent the rear end of the body, and a thermocouple bore which extends longitudinally in the body adjacent the heating element, the improvement wherein:

both the heating element and the thermocouple bore extend off center in the body of the probe, thereby providing the body of the probe with a combination of a minimum outer diameter and predetermined thicknesses between and around the heating element and the adjacent thermocouple bore.

2. An injection molding heated probe as claimed in claim 1 wherein the body of the probe has a forward portion with a generally cylindrical outer surface, the outer surface of the body of the probe having a plurality of circumferentially spaced fins projecting outward at a predetermined location along the outer surface of the body of the probe, the fins projecting outwardly to contact a surrounding cylindrical surface having a predetermined diameter to thereby accurately locate the body of the probe relative to the surrounding cylindrical surface.

3. An injection molding heated probe as claimed in claim 2 wherein the thermocouple bore extends from a threaded bore having a diameter larger than the diameter of the thermocouple bore the threaded bore being surrounded by a rim portion of the body at the rear end of the body, the threaded bore having a bottom surface from which the thermocouple bore extends, the rim portion of the body and the bottom surface of the threaded bore having a thermocouple groove which extends radially outward from the thermocouple bore, the probe including a retaining screw with a forward surface to be threadably received in the threaded bore to retain in place a thermocouple wire which is inserted into the thermocouple bore and bent into the thermocouple groove before the retaining screw is screwed into the threaded bore.

4. An injection molding heated probe as claimed in claim 3 wherein the rim portion of the body has a hole extending therethrough to receive a ground wire, the ground wire having an end which is securely engaged between the bottom surface of the threaded bore and the forward surface of the retaining screw.

5. An injection molding heated probe as claimed in claim 4 wherein the forward portion of the body of the probe extends into a well in a gate insert, and the forward portion of the body of the probe has a portion at the forward end which projects off center in alignment with a gate extending through the gate insert to a cavity.

* * * * *